(12) United States Patent
Ernstson et al.

(10) Patent No.: US 11,225,283 B2
(45) Date of Patent: Jan. 18, 2022

(54) WORM GEAR FOR A WORM GEAR MECHANISM OF A MOTOR VEHICLE STEERING SYSTEM MADE FROM FIBRE REINFORCED PLASTIC WITH A TARGETED ORIENTATION OF THE FIBRES

(71) Applicants: thyssenkrupp Presta AG, Eschen (LI); thyssenkrupp AG, Essen (DE)

(72) Inventors: Gernot Ernstson, Feldkirch (AT); Manuel Peter, Hinwil (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 12 days.

(21) Appl. No.: 16/646,702

(22) PCT Filed: Sep. 27, 2018

(86) PCT No.: PCT/EP2018/076249
§ 371 (c)(1),
(2) Date: Mar. 12, 2020

(87) PCT Pub. No.: WO2019/068548
PCT Pub. Date: Apr. 11, 2019

(65) Prior Publication Data
US 2020/0406961 A1     Dec. 31, 2020

(30) Foreign Application Priority Data
Oct. 2, 2017  (DE) .................. 10 2017 122 896.9

(51) Int. Cl.
*B62D 5/04*    (2006.01)
*F16H 55/06*   (2006.01)
*F16H 55/22*   (2006.01)

(52) U.S. Cl.
CPC .......... *B62D 5/0454* (2013.01); *F16H 55/06* (2013.01); *F16H 55/22* (2013.01); *B62D 5/0409* (2013.01)

(58) Field of Classification Search
CPC . B62D 5/0454; F16H 55/06; F16H 2055/065; F16H 55/22
See application file for complete search history.

(56) References Cited

U.S. PATENT DOCUMENTS 3,630,098 A * 12/1971 Oxley ................. B29C 45/1642
                                                    74/439
6,025,062 A *  2/2000 Krenkel .............. C04B 35/806
                                                   428/293.4
(Continued)

FOREIGN PATENT DOCUMENTS

DE    197 12 287 C    8/1998
DE    199 09 191 A    9/2000
(Continued)

OTHER PUBLICATIONS

English translation of International Search Report issued in PCT/EP2018/076249, dated Jan. 7, 2019.

*Primary Examiner* — Terence Boes
(74) *Attorney, Agent, or Firm* — thyssenkrupp North America, LLC

(57) ABSTRACT

A worm gear for a worm gear mechanism of a motor vehicle steering system includes a carrier body and a multiplicity of teeth with tooth surfaces. The teeth point radially outward and the carrier body is formed from a plastic including reinforcement fibers and has a multiplicity of ribs with rib surfaces which point radially outward from a central encircling ring-shaped web of the worm gear. The teeth are applied to the ribs of the carrier body by injection molding, and the reinforcement fibers are oriented, wherein the multiplicity of reinforcement fibers, in terms of their orientation,
(Continued)

follow the adjacent rib surfaces of the carrier body and/or the adjacent tooth surfaces of the teeth.

20 Claims, 4 Drawing Sheets

(56) References Cited

U.S. PATENT DOCUMENTS

| | | | | |
|---|---|---|---|---|
| 6,497,041 | B2 * | 12/2002 | Fujita | B29C 45/0055 |
| | | | | 264/138 |
| 6,626,261 | B1 | 9/2003 | Kurokawa | |
| 10,427,340 | B2 * | 10/2019 | Brochot | B29C 45/1676 |
| 2001/0030381 | A1 * | 10/2001 | Kobayashi | B29C 70/345 |
| | | | | 264/257 |
| 2006/0272438 | A1 * | 12/2006 | Kurokawa | C08L 77/06 |
| | | | | 74/388 PS |
| 2007/0089555 | A1 | 4/2007 | Tomoda | |
| 2008/0146402 | A1 | 6/2008 | Shinohara | |
| 2008/0314180 | A1 * | 12/2008 | Iwano | B62D 5/0409 |
| | | | | 74/425 |
| 2017/0120487 | A1 * | 5/2017 | Brochot | B29C 45/14311 |
| 2017/0166239 | A1 * | 6/2017 | Kim | B62D 5/008 |

FOREIGN PATENT DOCUMENTS

| | | |
|---|---|---|
| DE | 10119235 A | 10/2001 |
| DE | 60034912 T | 1/2008 |
| DE | 10 2007 063 422 A | 7/2008 |
| DE | 10 2012 102 776 A | 10/2013 |
| DE | 10 2014 115 804 A | 5/2016 |
| EP | 1 083 112 B | 5/2007 |
| EP | 1 780 444 B | 4/2012 |
| JP | S60206628 A | 10/1985 |
| JP | 200328275 A | 1/2003 |
| JP | 201025239 A | 2/2010 |
| WO | 2016/066291 A | 5/2016 |

\* cited by examiner

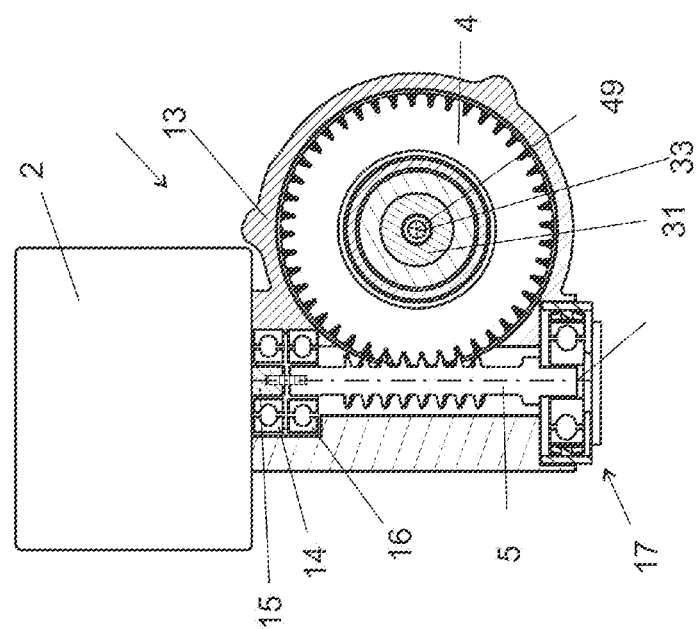
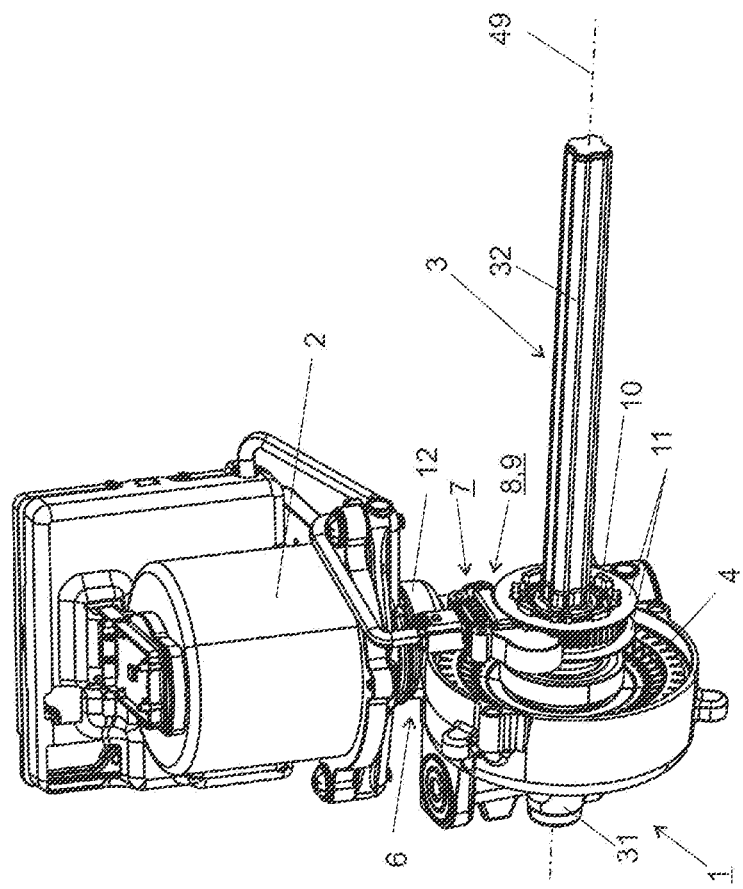
Figure 1
Figure 2

WORM GEAR FOR A WORM GEAR MECHANISM OF A MOTOR VEHICLE STEERING SYSTEM MADE FROM FIBRE REINFORCED PLASTIC WITH A TARGETED ORIENTATION OF THE FIBRES

CROSS REFERENCE TO RELATED APPLICATIONS

This application is a U.S. National Stage Entry of International Patent Application Serial Number PCT/EP2018/076249, filed Sep. 27, 2018, which claims priority to German Patent Application No. DE 10 2017 122 896.9, filed Oct. 2, 2017, the entire contents of both of which are incorporated herein by reference.

FIELD

The present disclosure generally relates to a worm gear for a worm gear mechanism of a motor vehicle steering system.

BACKGROUND

For the use of electromechanical power steering systems, there is a requirement, inter alia, for mechanisms which transmit an assistance torque from an electric motor to a steering shaft. Commonly, the electric motor drives a worm, which engages with a worm gear arranged rotationally conjointly on the steering shaft. For the transmission of forces, the worm gear must have a certain mechanical strength. Furthermore, it is sought to reduce noises generated owing to the engagement with the worm.

It is known to produce worm gears with fiber-filled plastics in the tooth region from a single-component plastic (1K) or a two-component plastic (2K).

The published application DE 101 19 235 A1 has disclosed a plastics toothed gear which has a main body portion composed of a synthetic resin comprising reinforcement fibers. A toothed portion arranged on the main body portion is produced from the same synthetic resin, with the difference that it comprises no reinforcement fibers. In the prior art, EP 1 083 112 B1 and EP 1 780 444 B1 disclose toothed gears produced from fiber-filled plastics, wherein the fibers have a defined aspect ratio. These solutions have proven to be disadvantageous because the fibers are oriented such that they depart from the surface of the teeth and thus cannot ensure the load capacity and durability of the toothed gear.

Thus a need exists for a plastics toothed gear for a worm gear mechanism of a motor vehicle steering system that exhibits improved mechanical strength and good durability and furthermore reduces running noises.

BRIEF DESCRIPTION OF THE FIGURES

FIG. 1 is a perspective view of a worm gear mechanism of an electromechanical servo steering system.

FIG. 2 is a cross-sectional view through the worm gear mechanism of FIG. 1.

DETAILED DESCRIPTION

Figure 3:
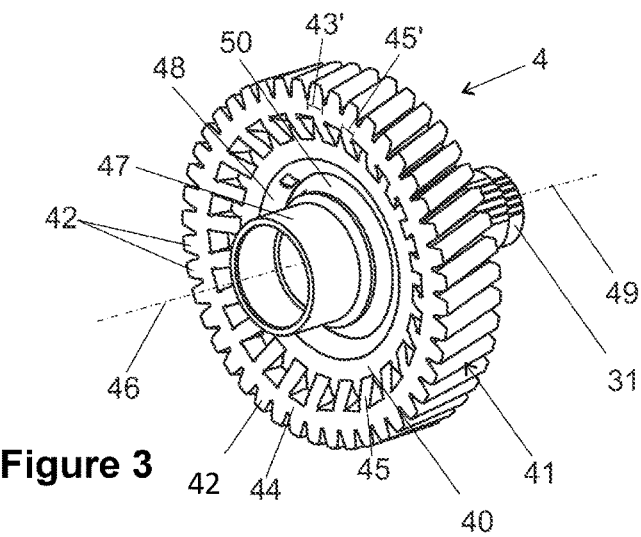
FIG. 3 is a perspective view of a 1K worm gear.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a worm gear for a worm gear mechanism of a motor vehicle steering system, to a worm gear mechanism for a motor vehicle steering system, and to a method for producing a single-component worm gear for a worm gear mechanism of a motor vehicle steering system.

Accordingly, a worm gear for a worm gear mechanism of a motor vehicle steering system is provided, comprising a carrier body and a multiplicity of teeth with tooth surfaces, wherein the teeth point radially outward, wherein the carrier body is formed from a plastic comprising reinforcement fibers and has a multiplicity of ribs with rib surfaces which point radially outward from a central encircling ring-shaped web of the carrier body, and wherein the teeth are applied to the ribs of the carrier body by injection molding, wherein the multiplicity of reinforcement fibers, in terms of their orientation, follow the adjacent rib surfaces of the carrier body and/or the adjacent tooth surfaces of the teeth. In this case, the worm gear is formed from two components (2K) and the teeth are formed separately, or injection-molded separately, on the ribs. The reinforcement fibers therefore follow the surface of the rib or of the tooth surface of the worm gear, such that the fibers do not project out of the rib or of the tooth surface. An adjacent rib surface is to be understood to mean that part of the rib surface which is situated closest to the respective fiber. An adjacent tooth surface is to be understood to mean that part of the tooth surface which is situated closest to the adjacent fiber. By means of the arrangement according to the invention of the fibers, the worm gear has a particularly good load capacity and durability. Furthermore, running noises can be reduced.

A multiplicity is to be understood preferably to mean more than half of the reinforcement fibers, more preferably more than 75% and more preferably more than 85% of the reinforcement fibers, which follow a particular orientation.

Preferably, the carrier body has reinforcement ribs which extend radially from the encircling ring-shaped web or the teeth of the worm gear in the direction of an axis of rotation of the worm gear or of the worm gear center. It is advantageous here if the carrier body is arranged on a hub of the worm gear and on a ring-shaped edge region adjoining said hub in a radial direction, wherein the reinforcement ribs project from the lateral surface of the ring-shaped edge region. It is also conceivable and possible for the worm gear center to be surrounded by the hub and in the ring-shaped edge region adjoining said hub in the radial direction.

Also provided is a worm gear for a worm gear mechanism of a motor vehicle steering system, comprising a multiplicity of teeth, wherein the teeth point radially outward from a central encircling ring-shaped web of the worm gear, and wherein the worm gear is formed from a plastic which comprises reinforcement fibers, wherein the worm gear is formed from one component (1K) and the multiplicity of reinforcement fibers are oriented and the orientation of the reinforcement fibers follows the adjacent tooth surface.

In a first orientation, the reinforcement fibers are oriented, in the cross section, along the tooth profile of the teeth or the rib profile of the rib in the case of a 2K worm gear. It is preferable here if the reinforcement fibers in a region of the tooth surface of the teeth, in particular in a region between 0 mm and 1 mm below the tooth surface, are oriented, in the cross section, along the tooth profile of the teeth or the rib profile of the rib. It is furthermore conceivable and possible for the reinforcement fibers to extend, in the cross section, from the rib surface to the web or to extend from the outer tooth surface, which meshes with the worm, to a region in which the reinforcement ribs are provided, or else to also encompass the reinforcement ribs.

In a further orientation, the reinforcement fibers are oriented parallel to the tooth surface, or the rib profile of the rib in the case of a 2K worm gear, in a longitudinal direction.

It is preferable for the reinforcement fibers or the fiber-reinforced plastic to be composed of synthetic resin or a thermoplastic, in particular of polyamide, polyacetal, saturated polyester, polyether and/or ether ketone.

The reinforcement fibers preferably have at least one type of fibers composed of metal fibers, carbon fibers or glass fibers.

Also provided is a worm gear mechanism for a motor vehicle steering system, having a worm gear as described above.

Also is a method for producing a single-component worm gear for a worm gear mechanism of a motor vehicle steering system, comprising a multiplicity of teeth, wherein the method comprises the following steps:
  providing a mold for the injection molding of the worm gear;
  injecting a synthetic resin with reinforcement fibers into the mold by means of a nozzle and a runner, specifically such that the multiplicity of reinforcement fibers are oriented and the orientation of the reinforcement fibers follows an adjacent tooth surface.

FIGS. 1 and 2 show a conventional worm gear mechanism 1 as part of an electromechanical power steering system, which transmits an assistance torque from an electric motor 2 to a steering shaft 3 which has an upper and a lower steering shaft 32, 31. A worm gear 4 is provided which is connected rotationally conjointly to the steering shaft 3. A rotation of the worm gear 4 about its axis of rotation causes an assistance force or an additional force to be introduced into the steering shaft 1 in order to correspondingly introduce an assistance force or an additional steering angle into the steering train.

The worm gear 4 is driven by means of a worm 5, which in turn is driven by means of the electric motor 2, wherein the output 6 of the electric motor 2 is correspondingly coupled, for the purposes of torque transmission, to the worm 5. Also provided in FIG. 1 is an integral structural unit 7 with a torque sensor unit 8 and a steering angle sensor unit 9. The torque sensor unit 8 detects the relative rotation of the upper steering shaft 32 with respect to the lower steering shaft 31 as a measure of the torque exerted manually on the upper steering shaft 32. The upper and lower steering shafts are connected to one another by means of a torsion bar 33. The upper steering shaft 32 is directly connected rotationally conjointly to a steering wheel (not illustrated). The lower steering shaft has, along a worm gear axis 49, a partial toothing for positively locking engagement with a joint arrangement (not illustrated), which in turn can be connected via a shaft (not illustrated) to a steering gear. By contrast, the steering angle sensor unit 9 measures the present steering angle of the lower steering shaft. The torque sensor unit 8 has an annular magnet 10 (permanent magnet) connected rotationally conjointly to the upper steering shaft and has magnetic flux conductors 11. An associated sensor unit 12 is connected in a spatially fixed manner to the unit of the electric motor 2.

FIG. 2 shows the worm gear mechanism 1 arranged in a housing 13, wherein the housing 13 accommodates a first rolling bearing 14 which radially supports the output shaft 15 of the electric motor 2. Also provided is a second rolling bearing 16, in which the drive-side end of the worm 5 is radially supported. That end of the worm 5 which is situated opposite the output of the electric motor 2 is mounted in a bearing device 17 which serves not only for the radial mounting of the worm 5 but also for angular compensation.

Figure 4:
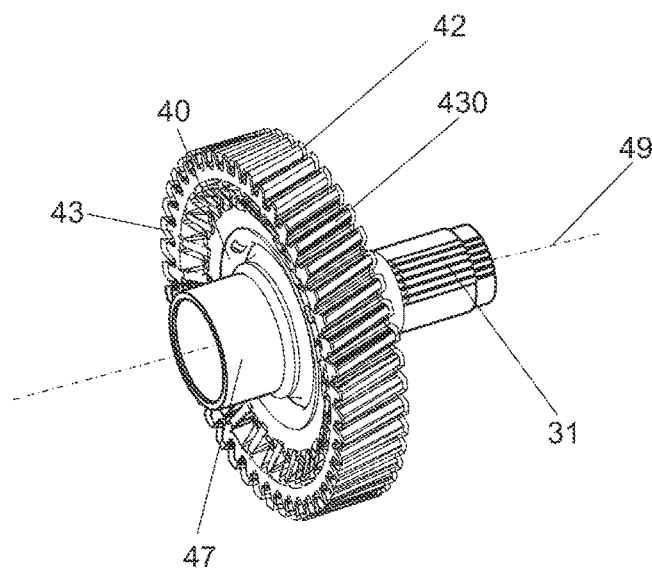
FIG. 4 is a perspective view of an injection-molded 2K worm gear.

As illustrated in FIGS. 3 and 4, the worm gear 4 is formed from a carrier body 40 and teeth 42 of a toothed portion 41. In the embodiment illustrated, the worm gear 4 is formed from a single body. The carrier body 40 and the teeth 42 are thus formed as a single piece. Here, the teeth 42 have in each case one rib 43 which extend radially outward from a central encircling ring-shaped web 44, which directly adjoins the toothing, of the worm gear 4. Reinforcement ribs 45 extend radially from the ring-shaped web 44 in the direction of an axis of rotation 49 of the worm gear or in the direction of the worm gear center 46. The carrier body 40 is arranged on a hub 47 of the worm gear and on a ring-shaped edge region 48 adjoining said hub in a radial direction. The reinforcement ribs 45 connect the carrier body 40, which is relatively thin or narrow in relation to the teeth 42, to the widened web 44 and to the teeth 42 adjoining said web, and serve as a reinforcement of the worm gear 4. The reinforcement ribs 45 therefore project from the lateral surface 50 of the ring-shaped edge region 48.

The worm gear 4 is produced by injection molding. The worm gear 4 is preferably formed from one component. For this purpose, a synthetic resin or thermoplastic with reinforcement fibers is injected by means of a nozzle and a runner into a mold, specifically such that the reinforcement fibers extend tangentially with respect to the tooth surface 420.

FIG. 4 shows a worm gear 4 corresponding to the worm gear from FIG. 3. In this case, it is a 2K worm gear. The carrier body 40 has, correspondingly to the worm gear toothing, a multiplicity of ribs 43 which point radially outward from the central encircling ring-shaped web 44 of the carrier body 40. The worm gear toothing 42 is applied to the ribs 43 of the carrier body 40 by injection molding, such that the ribs 43 are arranged under the toothing 42.

Figure 5:
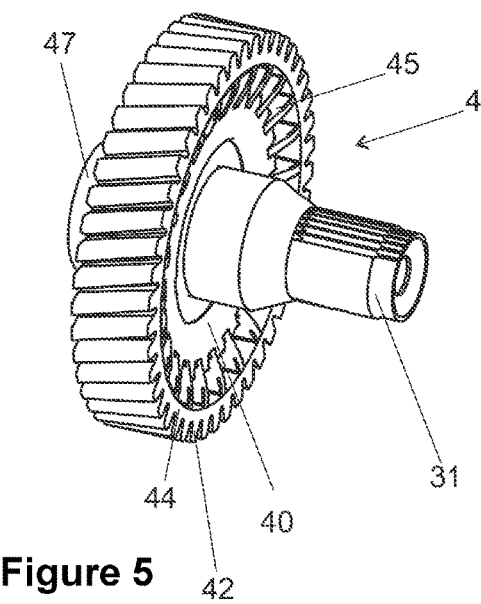
FIG. 5 is a further perspective view of the 1K or 2K worm gear.

FIG. 5 shows the 1K or 2K worm gear on the side facing the lower steering shaft 31. In this case, too, the worm gear 4 has reinforcement ribs 450, which project radially outward from the carrier body 40 and which become larger toward the web 44 or in the direction of the worm gear toothing.

Figure 6:
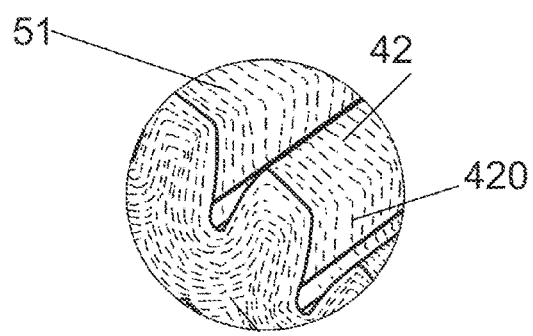
FIG. 6 is a schematic view of an orientation of the fibers in the teeth of a fiber-reinforced plastics toothed gear.
Figure 7:
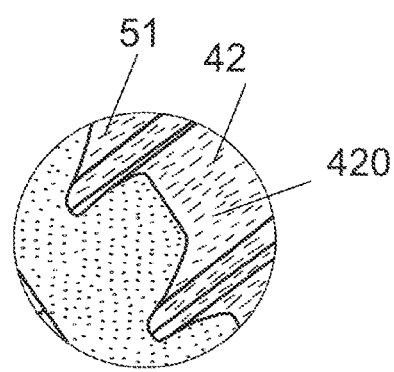
FIG. 7 is a schematic view of a second orientation of the fibers in the teeth of a fiber-reinforced plastics toothed gear.
Figure 8:
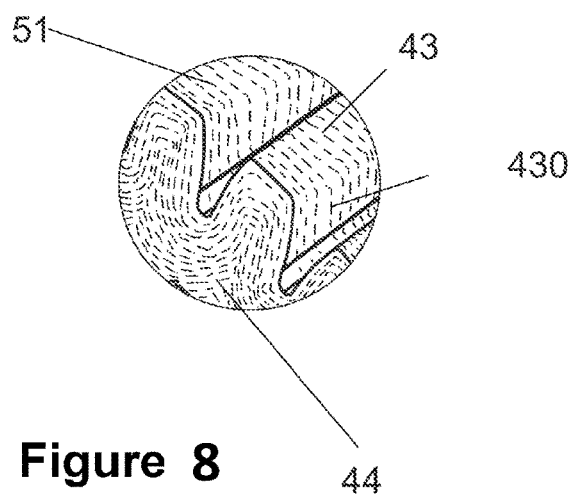
FIG. 8 is a schematic view of an orientation of the fibers in the ribs of a fiber-reinforced plastics toothed gear.
Figure 9:
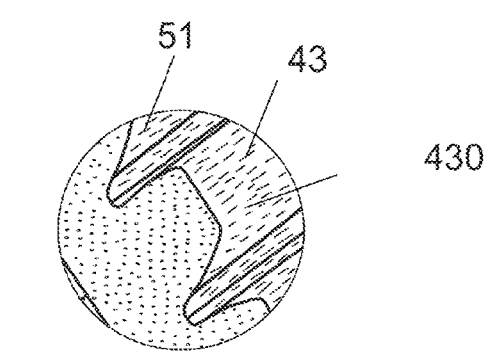
FIG. 9 is a schematic view of a second orientation of the fibers in the ribs of a fiber-reinforced plastics toothed gear.

FIGS. 6-9 illustrate two possible orientations of the reinforcement fibers. FIGS. 6 and 8 show the orientation of the reinforcement fibers 51 along the tooth profile (FIG. 6) or the rib profile (FIG. 8) in the cross section. The reinforcement fibers 51 follow the tooth profile or the rib profile. It is preferable here if the fibers 51 in a region of the tooth surface 420 or of the rib surface 430, preferably in a region between 0 mm and 1 mm below the surface 420, 430, substantially do not depart from the cross-sectional plane. The fibers 51 may, as illustrated in FIGS. 6 and 8, extend as far as the web 44 and also encompass the latter, and correspondingly closely follow the toothing or rib surface shape along the cross section. In FIGS. 7 and 9, the fibers 51 are oriented substantially parallel to the axis of rotation 49 of the worm gear 4. Here, the reinforcement fibers 51 are oriented parallel to the tooth surface 420 or rib surface 430 in a longitudinal direction. Here, the fiber ends project only into the cross section or out of the latter, as illustrated by dots in the figure. In these embodiments, the fibers may project from the outwardly projecting rib or tooth surface as far as the ring-shaped web, or may be provided only at the rib or tooth surface. Both forms of orientation have in common the fact that the fibers 51 are oriented such that they substantially do not depart from the tooth surface 420 or rib surface 430.

The orientation of the fibers 51 may be realized by means of different configurations of the worm gear 4 and of the injection molding process.

In one embodiment, provision is made whereby the liquid plastic is introduced into the mold from one side via a central gate point in the worm gear center. The teeth are thus filled radially, and the fibers assume an orientation as per FIG. 6. It is preferable here if the central web has, as far as the toothing, the least possible eccentricity, or in other words runs radially straight outward.

In another embodiment, multiple gate points may be provided. For example, the worm gear may be produced by injection molding using six nozzles, which are arranged so as to be distributed uniformly over the circumference. In the case of multiple gate points, the wall thickness 43' of the ribs 43 in the cross section and the wall thickness ratio between the wall thickness 43' of the ribs 43 and the wall thickness 45' of the reinforcement ribs 45 must be selected correspondingly. This is dependent inter alia on the number and positions of hot channels, the extent of the base wall thickness, the flowability of the plastic, or the stiffness of the rib. Other factors are the eccentricity of the central web or the eccentricity of the gate point with respect to the central web.

It is preferable here if the ribs 43 and the reinforcement ribs 45 are arranged offset with respect to one another and thus permit easier filling and in order to prevent cavity formation.

In a further embodiment, provision may also be made whereby the worm gear is a two-component wheel and the carrier body and the teeth are produced as two components. Here, in the region of the toothing, a plastic for forming the teeth is injection-molded onto the ribs of the carrier body. Here, the carrier body is produced as described above by injection molding and has the above-described orientation of the fibers, which follow the carrier body surface or rib surface.

What is claimed is:

1. A worm gear for a worm gear mechanism of a motor vehicle steering system, comprising:
a carrier body formed from a plastic comprising reinforcement fibers, the carrier body comprising:
a central encircling ring-shaped web;
a multiplicity of ribs with rib surfaces that point radially outward from the ring-shaped web; and
a multiplicity of teeth that point radially outwardly, the teeth each having tooth surfaces;
wherein the teeth are applied to the ribs of the carrier body by injection molding; and
wherein the reinforcement fibers are non-cross-linked and wherein at least 50% of the reinforcement fibers are oriented to follow the adjacent rib surfaces of the carrier body and/or adjacent tooth surfaces of the teeth.

2. The worm gear of claim 1 wherein the carrier body has reinforcement ribs that extend radially from the encircling ring-shaped web in the direction of an axis of rotation of the worm gear.

3. The worm gear of claim 2 wherein the carrier body is arranged on a hub of the worm gear and on a ring-shaped edge region adjoining the hub in a radial direction, wherein the reinforcement ribs project from a lateral surface of the ring-shaped edge region.

4. A worm gear for a worm gear mechanism of a motor vehicle steering system, comprising:
a central encircling ring-shaped web; and
a multiplicity of teeth that point radially outward from the encircling ring-shaped web, the teeth each including tooth surfaces;
wherein the worm gear is a single piece, plastic construction that comprises reinforcement fibers that are non-cross-linked and that are oriented unidirectionally to follow adjacent tooth surfaces.

5. The worm gear of claim 4 wherein the reinforcement fibers are oriented, in a cross section of the worm gear, along a tooth profile of the teeth.

6. The worm gear of claim 4 wherein the reinforcement fibers in a region of the teeth below the tooth surfaces a depth of between 0 mm and 1 mm, are oriented, in a cross section of the worm gear, along a tooth profile of the teeth.

7. The worm gear of claim 4 wherein the reinforcement fibers are oriented parallel to the tooth surfaces in a longitudinal direction.

8. The worm gear of claim 4 wherein the reinforcement fibers are composed of synthetic resin.

9. The worm gear of claim 8 wherein the reinforcement fibers include one or more of polyamide, polyacetal, saturated polyester, polyether, or ether ketone.

10. The worm gear of claim 4 where the reinforcement fibers comprise at least one type of fibers composed of metal fibers, carbon fibers, or glass fibers.

11. A worm gear mechanism for a motor vehicle steering system comprising the worm gear of claim 4 and a worm which engages with the worm gear.

12. A method for producing a single-component worm gear for a worm gear mechanism of a motor vehicle steering system, comprising a multiplicity of teeth which project radially outward, wherein the teeth have in each case one rib, which ribs extend radially outward from a central encircling ring-shaped web of the worm gear, the method comprising:
providing a mold for the injection molding of the worm gear; and
injecting a synthetic resin with reinforcement fibers into the mold by means of a nozzle and a runner, such that more than 75% of the reinforcement fibers are oriented to follow an adjacent tooth surface.

13. The method of claim 12 wherein a single gate point is provided which is arranged in the region of a hub, such that the teeth are filled radially.

14. The method of claim 12 comprising forming the ribs and the teeth separately, wherein both the ribs and the teeth contain the reinforcement fibers.

15. The method of claim 12 wherein the synthetic resin is injected in a way that prevents cross-linking of the reinforcement fibers.

16. The method of claim 12 comprising forming the teeth in a way that prevents the reinforcement fibers from projecting from a surface of the teeth.

17. The worm gear of claim 1 wherein the reinforcement fibers are present in the ribs.

18. The worm gear of claim 1 wherein more than 75% of the reinforcement fibers are oriented to follow the adjacent tooth surfaces of the teeth.

19. The worm gear of claim 1 wherein more than 85% of the reinforcement fibers are oriented to follow the adjacent tooth surfaces of the teeth.

20. The worm gear of claim 1 wherein the reinforcement fibers of the teeth follow the adjacent tooth surfaces of the teeth without projecting out of the teeth and into the ribs, wherein the reinforcement fibers of the ribs follow the adjacent rib surfaces without projecting out of the ribs and into the teeth.

* * * * *